Dec. 1, 1959  R. C. MIERENDORF ET AL  2,915,699
METAL DETECTORS
Filed Sept. 13, 1956  3 Sheets-Sheet 1

INVENTOR.
ROBERT C. MIERENDORF
BY CHARLES F. MEYER

United States Patent Office 2,915,699
Patented Dec. 1, 1959

2,915,699

METAL DETECTORS

Robert C. Mierendorf, Wauwatosa, and Charles F. Meyer, Milwaukee, Wis., assignors to Square D Company, Detroit, Mich., a corporation of Michigan Application September 13, 1956, Serial No. 609,683

23 Claims. (Cl. 324—41)

The present invention relates to metal detectors and more particularly to metal detectors having magnetically coupled circuits providing an energy transfer which is disturbed by metal objects entering the magnetic field.

In the prior art, detection of magnetic material was provided by setting up one or more magnetic fields in which the output signal polarities were 180° apart and there was no intermediate degree of phase relationship. In systems of this type, in order to produce a signal change in either phase or amplitude sufficient to actuate a phase or amplitude sensitive control device, considerable magnetic disturbance is necessary. Since most phase shift detectors or phase sensitive devices can be controlled by phase shifts much less than 180° the present invention has been directed to a system having intermediate values of phase shift which considerably increase the sensitivity of the unit. For example: a 30° phase shift of the phase of the input to a thyratron will result in ionization of the tube, therefore it is desirable that the magnetic sensitivity of the transducer be increased by requiring only a small percent of total possible phase shift to operate the system.

A continuous change in signal phase can be obtained if the output passes through a minimum point which does not reach a perfect balance. Therefore, by means of calibrating resistors shunting the driving coils and a tuning slug or disc, a sinusoidal minimum signal output may be provided when the transducer is undisturbed. The polarity of this minimum signal may be approximately midway between the induced voltages in the pickup coil. Introduction of magnetic material in a field of a first driving coil will advance the phase of the resultant signal while a similar disturbance of the other driving coil will retard the phase of the resultant signal. Inasmuch as retardation of the resultant signal will move its positive polarity into the leading edge of the plate to cathode voltage of a thyratron phase shift detector, the area adjacent the driving coil retarding the phase is selected as the detector area.

In general, the present invention involves an establishment of opposing induced alternating voltages which are not normally 180° out of phase but shifted from direct phase opposition by an angle θ which, when combined, produce a resultant signal dependent upon the angle θ and the difference in amplitudes.

Several methods are available for establishing opposing alternating voltages resulting from the magnetic field, for example: two magnetic fields may be set up by a pair of driving coils and a third coil is positioned to intercept both fields. Alternately, a single magnetic field may generate opposing voltages in pickup coils connected in opposition. In the present system in which it is desired to disturb the field outside the coil assembly, a greater concentration of flux in the area of detection may be obtained by the use of two driving coils wherein one of the driving coils is adjacent said area and with the aid of a ferromagnetic core, an intensified magnetic field will extend to greater distances. The metal object therefore need only pass adjacent the magnetic transducer without passing between the driving and pickup coils facilitating ease of operation and handling.

Field distortion may be due to either the conductivity or permeability of an object placed in the area of detection. An object having ferromagnetic properties introduced into the field of a driving coil will increase the mutual inductance between the driving coil and the pickup coil. A slight disturbance by an object having ferromagnetic properties only shifts the phase of the resultant signal, however a further increase in disturbance and permeability may produce a relatively large increase or decrease in the amplitude of the resultant signal voltage. Objects primarily conductive and only slightly, if at all magnetic, will decrease the mutual inductance between the driving coil and pickup coil due to the eddy currents set up inside the object which produce an opposing magnetic field decreasing the mutual inductance between the driving coil and pickup coil.

The sensitivity of the magnetic transducer is increased by adjusting coil and core assembly to provide a minimum resultant signal voltage whereby only a slight disturbance in the magnetic field will produce a large phase shift. Larger distubances of the magnetic field may increase the amplitude of the resultant signal but only a slight phase shift is necessary in order for the phase shift detector circuit to operate and thereby control the output.

An object, therefore of the present invention is the provision of a magnetic transducer for producing an alternating magnetic field in an area outside of the assembly where it is sensitive to the presence of metal objects.

Another object is to provide a detector system which produces a magnetic field inducing alternating voltages in a pickup element which are displaced from phase opposition by an angle θ.

A further object of the invention is the provision of a signal voltage from a transducer which is the resultant of two alternating voltages displaced from phase opposition by an angle θ.

Still another object is to provide a signal voltage output from a magnetic transducer which is resultant of two opposing alternating induced voltages and is shifted in phase by a change in amplitude in either of said voltages.

A still further object is the provision of detector circuits for sensing a slight shift in phase of the output signal voltage of a magnetic transducer.

Another object is to provide a metal detector capable of providing a continuous shift in phase of a signal voltage and in proportion to the degree of the magnetic field disturbance.

Further objects and features of the invention will be readily apparent to those skilled in the art from the specification and appended drawing illustrating certain preferred embodiments in which.

Figure 1:
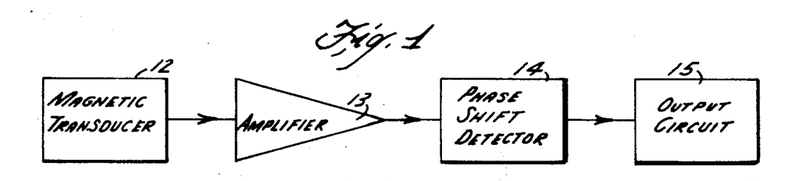
Fig. 1 is a block diagram of a preferred embodiment of the invention.

Referring now to the drawings wherein like reference characters designate like or corresponding parts throughout the several views, there is shown in Fig. 1 a system for detecting metals or objects having electrical properties of permeability or conductivity which are placed in the field of the magnetic transducer 12. The signal output of the magnetic transducer is coupled to an amplifier 13 which may include one or more stages of amplification and an RC phase shift network providing minor phase adjustments to the output signal from the magnetic transducer 12. The amplified signal is coupled from the amplifier 13 to the phase shift detector 14 to control a grid circuit of a thyratron or any other electronic or magnetic device which is responsive to a phase shift in the output signal of the transducer. The phase shift detector 14 or gate network output is coupled to the output circuit 15 which may include a relay in a thyratron plate circuit to be energized or de-energized for completing the path to external circuits.

Figure 2:
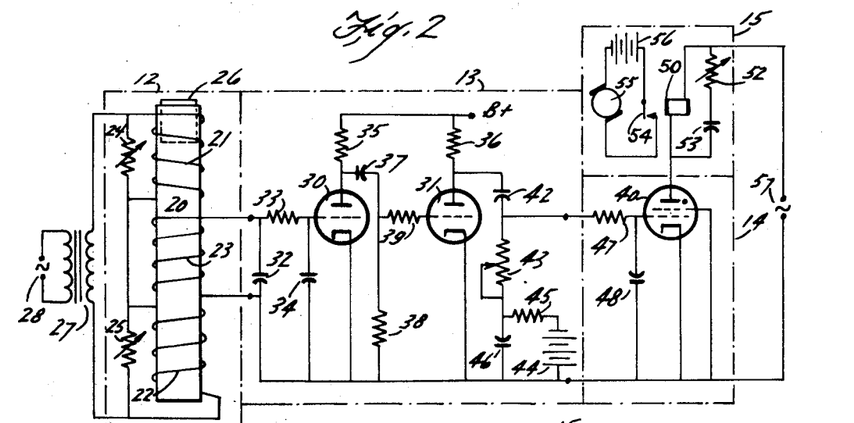
Fig. 2 is a schematic diagram of the preferred embodiment showing in detail the elements referred to in the block diagram of Fig. 1.

Referring now to the schematic diagram of the metal detector shown in Fig. 2, the magnetic transducer is shown to include a pair of exciting or driving coils 21 and 22 connected in series to an A.C. supply source 28 through a step-down transformer 27; resistors 24 and 25 are connected in shunt with driving coils 21 and 22 respectively for controlling the small output currents individual to each driving coil.

Exciting or driving coils 21 and 22 are wound in opposite directions around a common core 20 to produce opposing magnetic fields and flux inducing alternating voltages of opposite phase in a pickup signal output coil 23 which is wound around the center of the core 20 to produce an output or resultant signal which is equal to the unbalance in the flux or magnetic field surrounding it.

The iron core 20 is constructed preferably from transformer grade electrical steel, e.g., 2 to 4% silicon steel, and laminated to further reduce eddy current losses. The core 20 may be free to move along the axis of the coils 21—23 or a tuning slug or disc 26 may be fitted and positioned adjustably in one end of the core for correctly balancing the magnetic fields of the coils 21 and 22 to induce alternating voltages of approximately equal amplitudes in the pickup coil 23. The magnetic core 20 also serves to concentrate and focus the magnetic fields of the driving or exciting coils 21 and 22 along the axis of the coil or magnetic transducer assembly whereby the most sensitive area of the magnetic field for detecting a disturbance is along its axis as will be described more fully in connection with Figs. 6 and 7. The magnetic transducer coil assembly may be surrounded by a magnetic jacket except for the pickup end to provide a shield for magnetic disturbances outside the assembly except for the area adjacent the pickup end.

The output signal from the pickup coil 23 is coupled to the amplifier circuit 13 including tubes 30 and 31 to amplify the relatively small signal output, on the order of ½ volt, for effectively controlling a power output circuit. Voltage amplifiers using vacuum tubes, transistors and magnetic components are all capable of providing the necessary signal gain, however the functions of voltage amplification may be performed by a single stage unit; for example: the conventional magnetic amplifier which provides the necessary properties to be utilized both as an amplifier and a phase shift detector for an alternating current signal.

A shunting capacitor 32 is connected across the pickup coil terminals to provide filtering of harmonic frequencies which may become objectionable at or near the balance point of the magnetic transducer since the fundamental signal output level is very low. Resistor 33 connected in series in the grid circuit and capacitor 34, connected between grid and cathode, form an RC input network providing minor phase adjustment for the signal output of the transducer. This phase adjustment shifts the pickup signal to the proper in phase relationship with the line voltage supply before entering the voltage amplifier stage.

In the amplifier circuit 13 of Fig. 2 the plate of the amplifier 30 is connected to B+ supply through the plate load resistor 35 and is coupled to the grid of the succeeding amplifying stage by coupling capacitor 37 and resistor 39 connected in series to the grid circuit of the amplifier 31. The grid leak resistor 38 is connected in series with the resistor 39 in the grid to cathode circuit providing grid bias for the second amplifier stage. The plate of the amplifier tube 31 is connected to B+ through the plate load resistor 36 and is coupled to the grid of the thyratron 40 through the coupling capacitor 42 and series resistor 47.

Adjustable resistor 43 in the grid biasing circuit of the thyratron 40 provides a sensitivity control by adjusting the phase of the amplified signal voltage. The negative bias source 44 is connected in series with resistor 45 and shunted by a capacitor 46. Sensitivity control may be necessary for applications where the system of Fig. 2 must respond selectively to the size or distance of the object from the transducer. An alternate sensitivity adjustment or control may be provided by changing the magnitude of the D.C. bias in the input of the phase detector. In either case, as additional D.C. bias is selected or as the signal phase is advanced, the phase shift of the output signal must be increased as the result of a greater disturbance of the magnetic field to actuate the output circuit and conversely, provision of less negative bias and/or phase retardation of the pickup signal requires a smaller disturbance of the magnetic field to control the thyratron 40.

Capacitor 48 is shown connected between the grid and cathode of the grid controlled gaseous discharge device or tube 40 to filter transients in the signal input to the grid thereby preventing misfiring of the tube 40. The shield of the gas tube 40 is connected to ground and the plate is connected to the A.C. plate supply source 57. An output relay 50 is connected in series in the plate circuit and includes a fixed capacitor 53 in series with the adjustable resistor 52 shunting the relay 50 to provide additional output circuit operating time or a fixed or adjustable time lag before reset, whereby the output circuit will be actuated for a timed interval added to the time that recession of the object disturbing the magnetic field would normally reset the device. The output relay 50 therefore will remain closed for a fixed interval after the control circuit has been reset depending upon the LRC time constant of the relay coil holding circuit wherein the resistor 52 provides a variable minimum output time control. Relay contacts 54 are shown in series with a motor 55 or other apparatus which it is desired to control having a supply source shown as a battery 56.

The principle of operation of this system is applicable over a wide range of supply frequencies; however, circuit adjustment and components will require design for specific frequency levels to provide optimum performance for such operating characteristics as sensitivity and speed of operation.

Figure 10:
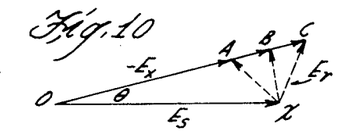
Fig. 10 is a typical vector diagram of induced alternating voltages in the pickup coil of the magnetic transducer.

Referring more particularly to the vector diagram of Fig. 10 to describe the operation of Figs. 1 and 2, the induced alternating voltages have two components, $E_x$ and $E_s$ produced by the flux individual to the coils 21 and 22. In operation, positioning of the disc or slug and adjustment of resistances 24 and 25 produces opposing alternating induced voltages $E_x$ and $E_s$ in the pickup coil 23 which are approximately equal in magnitude but out of phase θ degrees. When ferromagnetic material is introduced in the field of coil 21, Ex increases slightly and the resultant pickup voltage Er is retarded in phase; and depending upon the initial balance of Ex and Es at points A, B, or C; the amplitude or magnitude of the resultant voltage Er will vary. Since Ex is proportional to the mutual inductance between the exciting coil 21 and pickup coil 23, the best configuration is provided when the largest absolute change occurs in the mutual inductance by disturbance of the ferromagnetic material. Absolute change rather than percentage change is considered primary because Er would normally be adjusted to an initial nominal value regardless of the magnitudes of Es and Ex.

Considering either the mutual inductance between exciting coil 21 and pickup coil 23, or exciting coil 22 and pickup coil 23, the path for mutual flux is essentially the same as the self flux of the pickup coil when either exciting coil is energized; and the mutual inductance between a single exciting coil and the pickup coil is proportional to the self inductance L of the pickup coil. Further, since $$L = 2W/I^2 \quad (1)$$

where W is the energy stored in the self-flux field of the pickup coil and I is the coil current which is assumed constant, it follows that the best configuration or arrangement of the magnetic transducer is one which will produce the largest change in stored energy W. Since the stored energy is related to the magnetic field intensity $$W = (\mu/2) \iiint H^2 dv \quad (2)$$

it follows that when an element of volume $\Delta v$ has its permeability changed from $\mu_0$ to $\mu$ by the insertion of a ferromagnetic material, the total stored energy changes by $$\Delta v = [(\mu - \mu_0)/2] H^2 \Delta v \quad (3)$$

where H is the field intensity at the point under consideration. The change of energy is proportional to the square of the magnetic field intensity at the point of insertion of the magnetic material; therefore the best configuration of coils for a given number of ampere turns produces the maximum field intensity at some point along the coil axis to the right of the pickup coil.

Exciting coils 21 and 22 are energized through the step-down transformer 27 from the alternating current source 28 producing a magnetic field establishing induced alternating voltages in the pickup coil 23. Because of the physical dissymmetries in the construction of a magnetic transducer, resistors 24 and 25 establish the minimum desired output wherein the adjustment of these latter elements provides both phase and amplitude control over the signal voltage output of the coil. In practice it has been found that in many instances, a single resistor shunting either coil 21 or 22 will produce the desired balance of alternating voltages induced in the pickup coil 23.

The effect of balancing resistors is to change the phase displacement angle θ between Ex and Es wherein the angle θ represents the phase displacement from 180° phase opposition of the opposing induced alternating current voltages. The current in coils 21 and 22 is adjusted to lead or lag one another by the selection of the resistors 24 and 25 and, as shown in the vector diagram, the current through the coil pickup end of the transducer is made to lead the current in the exciting coil at the opposite end.

The vector diagram of Fig. 10 and the circuit diagram of Fig. 2 are directed particularly to the phaseback principle for controlling the phase shift detector 14. This mode of operation presumes disturbance of the magnetic field by ferromagnetic material increasing the mutual inductance between the exciting coil at the pickup end of the transducer and the pickup coil 23. As a result of the increase of mutual inductance due to introduction of ferromagnetic material in this portion of the field, one of the alternating induced voltages in the pickup coil 23 are increased in magnitude to phaseback the resultant signal Er.

It should be obvious by slightly modifying the circuit of Fig. 2 and comprehended by the block diagram of Fig. 1, that a phase shift in either direction may be used to control the phase shift detector and output circuit. For example, in detecting objects having electrical properties primarily of conductivity rather than permeability, eddy currents set up in the object tend to decrease the mutual inductance between the exciting coil and pickup coil. An object having properties of conductivity rather than permeability when introduced in the magnetic transducer field decreases the magnitude of the alternating induced voltage Ex in the pickup coil 23 tending to phase ahead resulting signal Er.

Figures 6, 7, 8A, 8B, 8C, 8D:
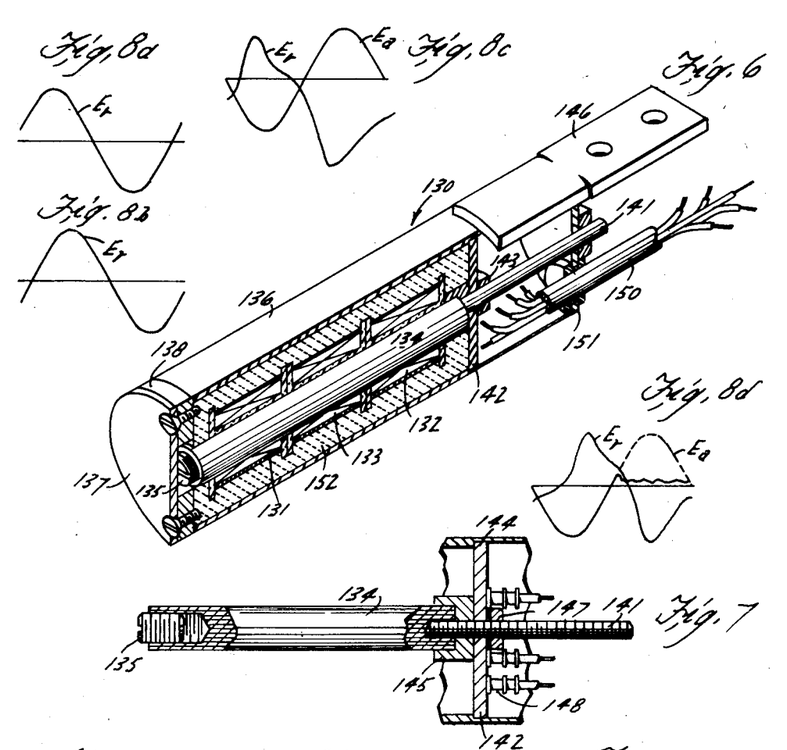
Fig. 6 illustrates a preferred embodiment shown partly in cross-section of the magnetic transducer of the invention.
Fig. 7 is a partial view of the magnetic transducer shown in Fig. 6 and more particularly the core and terminal structure.
Figs. 8a through 8d are typical wave forms showing the operation of the detector circuit of Fig. 2.

Another instance in which the signal Er would be shifted ahead, assuming proper shielding, would be achieved by introducing a ferromagnetic material in the magnetic field adjacent of coil 22 tending to increase the alternating induced signal Es in the pickup coil 23. The mode of operation in which the phase of Er will be shifted forward would be applicable primarily in systems requiring gradual turning on or increase of power wherein the phase of the pickup signal is adjusted to gradually increase the conductivity portion of the cycle of this thyratron, magnetic amplifier or the like. The wave forms in Fig. 8, particularly Figs. 8c and 8d illustrate the phaseback principle of operation wherein it can be readily seen that phasing ahead Er will cause the resultant signal to intersect the positive half cycle of the anode voltage to control the period of conduction of the phase shift detector 14.

A voltage gain is provided in the transducer by providing substantially more turns in the pickup coil 23 than the driving or exciting coils 22. A cylindrical and rectangular magnetic core of approximately the same length as the coil assembly concentrates and focuses the fields set up by the driving coils along the axis of the core. Correctly positioning the core, balances the fields of the coils 21 and 22 about the pickup coil 23, approximately cancelling out the alternating voltages induced in the pickup coil. The cancelling of induced voltages in the pickup coil by adjustment of the assembly is commonly referred to as a null condition. In order to adjust for this condition of null or zero signal output, the core must be free to move along the axis of the coils, or a tuning slug 26 must be fitted at one end of the core. Moving the core to either side of the null position will increase the flux originating in the driving coil at that end resulting in a signal output from the pickup coil of that polarity. Assuming that the core is adjusted for a null or approximately null position, introduction of magnetic materials in the field of either driving coil will similarly reduce the reluctance of its magnetic path, increase the flux and produce an output of corresponding polarity wherein the focusing or concentration of the field by the core provides a metal sensitive area for disturbing the field along the axis of the coil assembly.

Adjustment of the tuning slug or disc 26 and coil calibrating resistors 24 and 25 produces sinusoidal resultant signal output when a transducer magnetic field is undisturbed. As shown in the vector diagram of Fig. 10, the phase of this resultant signal is approximately midway between the output voltage polarities associated with each of the driving coils. A continuous change in signal phase can be obtained if the pickup signal passes through minimum signal output.

Introduction of ferromagnetic material in the field of coil 22 will phase the signal forward while a similar disturbance of the field of coil 21 will retard the phase of the resultant output signal. Since retarding the resultant signal will move the positive polarity of the pickup signal into the leading edge of the plate to cathode voltage of the thyratron phase shift detector, the magnetic field adjacent to coil 21 is selected as the detector area or pickup surface of the transducer 12 for off-on operation.

Disturbance of the magnetic field produces a continuous retardation of the resultant signal depending in degree or magnitude upon the magnitude of the disturbance; however, as the external disturbance becomes appreciable an increase in signal amplitude also occurs. A 20 to 30° phase shift of the resultant or pickup signal is sufficient to actuate the phase shift detector 14 and no appreciable change in amplitude occurs. Further increases in field disturbance result in a maximum phase shift of approximately 90° and an amplitude increase of 100 times. After the phase shift detector or phase sensitive control has been triggered, it will remain conductive regardless of the increase in magnetic disturbance and resetting will occur only after the magnetic object has receded from the transducer field causing a shift in phase of the resultant signal.

Referring now to the signal circuit shown in Fig. 2, the pickup signal Er as shown in Fig. 8a and 8b is fixed in phase by the resistance capacitive phase shift network including resistor 33 and capacitors 32 and 34. A minor phase adjustment must be made on the undisturbed standby signal from the pickup coil after it leaves the transducer in order to bring the signal in proper in-phase relationship with the line voltage supply. The RC input network provides this function before the signal enters the voltage amplifier.

The major signal change is one of application wherein the small pickup signal output from the transducer requires amplification in order to effectively control the power output circuit. Voltage amplifier stages provided by the amplifiers 30 and 31 provide the signal gain necessary for resistance coupling of the signal to the thyratron 40.

Sensitivity control is provided by the variable adjustment of resistance 43 whereby circuit will respond selectively to object size or distance of object from the transducer. Adjustable resistor 43 varies the phase of amplified input to control the signal level to the grid of the thyratron 40. The mode of sensitivity adjustment would be to advance or retard the phase of the output signal electronically in the control circuit by controlling the phase shift network, a resistive capacitive phase shift network or adding additional phase shift circuits. With either an increase in D.C. bias or advance in phase of the pickup signal, an additional shift in phase of the pickup signal must be provided which must be the result of the larger external disturbance or a disturbance in the magnetic field in order to fire the thyratron 40. Conversely, retarding the phase of the pickup signal or decreasing the D.C. bias requires less phase shift of the resultant or pickup signal to operate the phase shift detector 14 or thyratron 40.

Thyratron 40 is normally non-conductive in the circuit of Fig. 2 controlled by the A.C. signal voltage between its grid and cathode which is of opposite polarity to the A.C. plate to cathode supply 57. As the resultant signal Er changes phase due to field disturbance, the grid to cathode voltage is shifted as shown by the circuit embodiment, becoming more in phase with the plate supply and allowing the tube to ionize. The resultant or pickup signal Er shown in Fig. 8a illustrates the standby condition of the circuit in which no disturbance is produced in the magnetic field of the transducer. Fig. 8c shows the undisturbed resultant or pickup signal Er and the plate supply Ea wherein Er holds the grid negative during the positive swing of the supply voltage. As a result of a disturbance of the magnetic field of the transducer adjacent to the driving coil 21 or in the detector area, Er is retarded in phase as shown in Fig. 8b. This shift in phase causes the grid of the thyratron 40 to swing positive during the positive cycle of the plate supply voltage causing the tube to fire as shown in Fig. 8d.

As a result of conduction or detection by the phase shift circuit 14 or thyratron 40, the output relay 50 in the thyratron plate circuit is energized operating contacts 54 and the remainder of the output circuit completing the circuit to the motor 55 or other external circuits. The power output circuit is provided with a fixed or adjustable time lag before reset to provide for brief or short periods of disturbance of the magnetic field by a metallic object. A relay 50 will remain operated for a fixed interval after the control circuit is reset to standby depending upon the LRC time constant of the relay coil holding circuit including capacitor 53 and adjustable resistor 52, wherein the main output time is adjustable by varying the resistor 52. The additional output circuit operating time will provide for proper operation of external devices such as valves, relays or other devices having a main energization time period.

Figure 3:
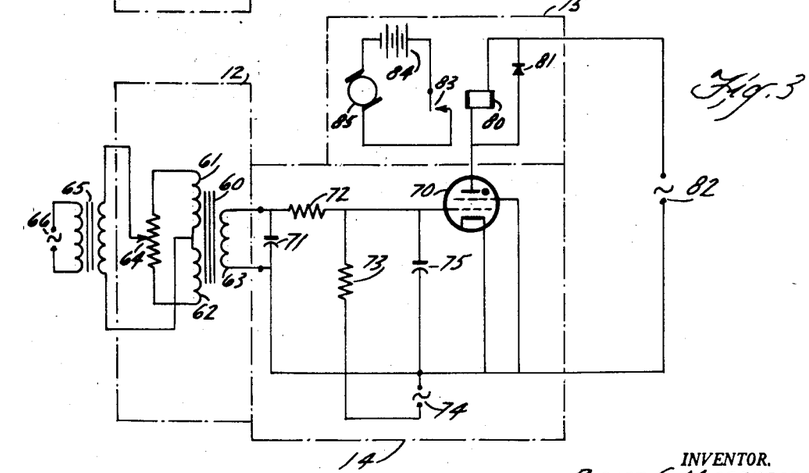
Fig. 3 is a schematic diagram of a modification of the metal detector circuit of Fig. 1.

The modification of the metal detector system illustrated in Fig. 3 includes a magnetic transducer 12 having driving coils 61 and 62 wound in opposite directions and energized from the alternating current source 66 through a stepdown transformer 65. The balance of current through the driving coils is adjusted by a potentiometer 64 having a resistor element connected across the parallel connected coils 61 and 62. The pickup or signal output coil 63 is wound around a common core 60 with the driving coils 61 and 62 having its output connected to the phase shift detector circuit 14. The driving coils 61 and 62 are wound in opposite directions to produce opposing induced alternating voltages in the pickup coil 63.

The core 60 includes a tuning slug or disc (not shown) which is adjusted along with the potentiometer 64 to provide a magnetic field and pickup signal from the coil 63 similar to that described in connection with Fig. 2. The magnetic transducers of Figs. 2 and 3 are intended to be interchangeable wherein Fig. 3 illustrates another form of magnetic transducer arrangement for the establishment of induced alternating voltages in a pickup coil which are normally of equal amplitude and opposite phase or displaced from 180° phase opposition by an angle θ to provide a resultant signal voltage output Er.

Figure 9A:
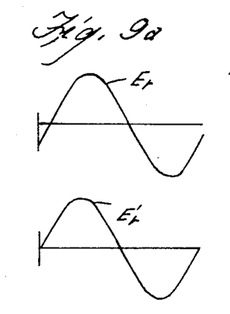
Figs. 9a–9c illustrate typical wave forms in the operation of the circuit shown in Fig. 3.

Since the embodiment of Fig. 3 does not employ an amplifier for raising the level of the output signal of the magnetic transducer, the initial phase displacement of the induced alternating voltages may be larger, or other means utilized to produce a larger output or resultant signal Er. The pickup signal wave forms are shown in Fig. 9a wherein Er is the resultant signal retarded in phase by disturbance of the magnetic field of the transducer and E'r the resultant pickup signal with the circuit in standby operation in an undisturbed magnetic field.

Figure 9B:
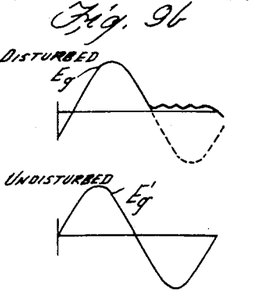

Capacitor 71 is connected across the input to provide a low pass filter bypassing frequencies above the fundamental pickup signal frequencies; resistor 72 is connected in series between the pickup coil and grid of the tube 70; and resistor 73 in series with an A.C. source 74 is connected across the input circuit whereby the A.C. signal, which may be obtained from the filament voltage supply, is combined with the pickup or output signal Er from the coil 63. The A.C. signal supplied by the source 74 is displaced α degrees from 180° phase opposition with the pickup signal Er and substantially smaller than the pickup signal due to the voltage drop of resistor 73. Addition of the two signals produce a resultant grid signal Eg shown in Fig. 9b.

Gaseous discharge tube 70 is connected across the plate supply source 82 wherein the output relay 80 is connected in series therewith. The control grid of the tube is coupled to the cathode by the filter capacitor 75 to remove transients in the signal input to the grid thereby preventing misfiring of the tube 70; the tube shield, as shown, is also connected to the cathode. Rectifier 81 is connected across the relay 80 in the output circuit 15 to provide for operation of the relay upon conduction of the tube 70.

Relay contacts 83 are operated upon energization of the relay coil to complete the circuit to the motor 85 or other apparatus in the output circuit completing a circuit to an energy source shown as a battery 84.

In operation, the magnetic transducer is adjusted by means of the potentiometer 64 and a tuning disc or slug to induce voltages $Es$ and $Ex$ shown in Fig. 10, producing an output or pickup signal which is the resultant of the addition of the alternating induced voltages. The first control balancing adjustment is provided by positioning the tap of potentiometer 64 which controls the phase angle of $Ex$ and $Es$ by varying the resistance of the RL combination present of each driving coil 61 or 62. Controlling the phase of $Es$ and $Ex$ adjusts the angle $\theta$ which is the angle of displacement from direct opposition of the voltages $Ex$ and $Es$. Having determined the angle $\theta$ either $Ex$ or $Es$ may be adjusted in amplitude to produce a minimum amplitude signal $Er$. The adjustment in amplitude is provided by a slug or disc which will vary the amplitude of $Ex$ or $Es$ depending upon which coil the slug or disc is adjacent. There is essentially no interaction between the resistance and permeability adjustments, i.e., the potentiometer and slug or disc controls, therefore the initial adjustment of the transducer may be made very simply.

In the embodiment shown in Fig. 3, the resultant $Er$ is adjusted by increasing the magnitude of the voltage induced by driving coil 61, for example: from voltage OA, to voltage OB and then to OC by introduction of ferromagnetic objects in the magnetic field of coil 61 increases the voltage vector $Ex$ to OC wherein the resultant $Er$ is retarded in phase and increased in amplitude. As a result of increasing amplitude and shift in phase of the resultant signal $Er$, the input signal $Eg$ applied to the grid of the tube 70 is retarded.

Figure 9C:
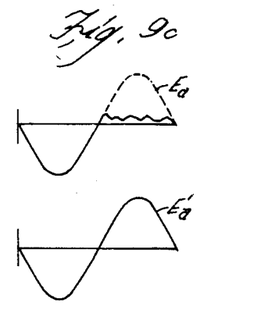

The grid signal $Eg$ is therefore retarded by a combination of two factors and combined with the A.C. signal from the source 74. Increasing the amplitude of $Er$ in combination with the phase shift of $Er$ causes the resultant signal $Eg$ to shift into positive half cycle of the plate supply voltage 82 causing the tube 70 to conduct as shown in Fig. 9c. Conduction of the tube 70 substantially decreases its input impedance tending to retard the phase of $Er$ even further and provide positive action for firing the tube.

During the period of non-conduction of the tube 70, the input impedance of tube 70 is very high. Upon conduction, the input impedance decreases substantially placing the conductive state of grid to cathode impedance in parallel with capacitor 71 decreasing the capacitive reactance of the input circuit whereby the phase of the pickup signal voltage is retarded assuring continued positive swing of the grid signal during the beginning of the positive cycle of the plate supply voltage. Firing of the tube 70 completes the circuit through the coil 80 operating contacts 83 to complete the external circuit to the motor.

The circuit and description of operation of Fig. 3 illustrates one mode of operation of a preferred embodiment, however the teaching should not be restricted thereto for as seen from the foregoing description of Figs. 1 and 2, either of the two opposed induced voltages may be varied to shift the phase of the resulting signal $Er$, for example; the phase of $Er$ may be advanced rather than retarded by introducing the ferromagnetic material in the field of coil 62. Metal objects exhibiting different characteristics, for example, conductivity or combination of conductivity and magnetic properties, vary the resulting pickup signal as more fully explained in the preceding description. The detector or control circuit or system therefore may be modified to control the resultant signal $Er$, in accordance with the foregoing principles, to provide the desired functional operation.

Figure 4:
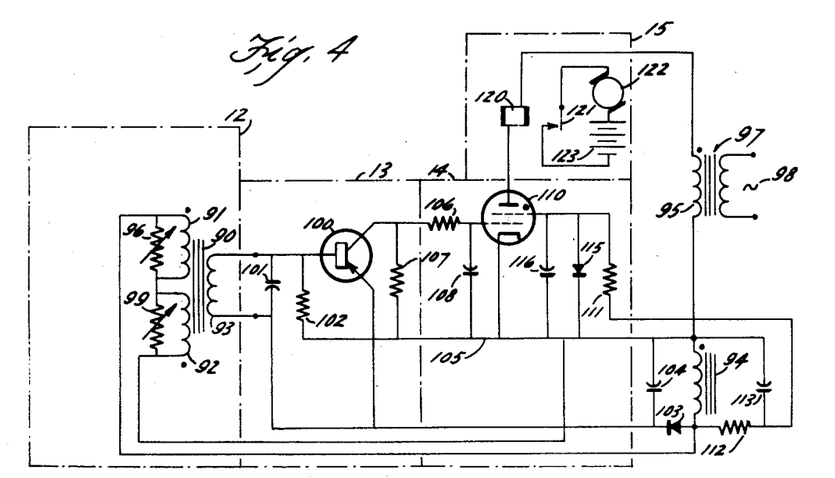
Fig. 4 illustrates another modification of the metal detector shown in Fig. 1.

Referring to Fig. 4 which illustrates a modification of the metal detector shown in Fig. 1, a magnetic transducer 12 takes the form of the transducer shown in connection with Fig. 1 wherein a pair of series connected driving coils 91 and 92 shunted by resistors 96 and 99 respectively, are wound in opposite directions about a core 90 and connected across one of the secondaries 94 of the transformer 97. A source of alternating current supply 98 is connected to the primary of transformer 97 for supplying plate voltage to the gaseous discharge device 110 via the secondary 95 and reduced supply voltage from the secondary 94 for operating the amplifier 13 and driving coils of the magnetic transducer. Driving coils 91 and 92 produce opposing magnetic fields and flux of opposite phase in a pickup coil 93. The pickup coil 93 is wound about the center of the core 90 whereby the flux produced by the driving coils 91 and 92 resolves to an output resultant signal which is equal to the unbalance in a magnetic field surrounding pickup coil 93.

The iron core 90 may be constructed of the same material and in the same manner as the core 20 in Fig. 2. However, it is realized that the shape of the core may be cylindrical or rectangular and the tuning disc or slug may be located at either end of the core or may be truly a disc positioned next to the end of the core wherein the proximity of the disc to the core may be adjustable to vary the magnetic fields of the coils 91 and 92.

The output signal from the pickup coil 93 is coupled to the amplifier circuit 13 including an amplifying element herein shown as a transistor 100. A shunting capacitor 101 is connected across the pickup coil terminals to provide filtering of harmonic frequencies at or near the balance point of the magnetic transducer, and a resistor 102 is connected to the base of the transistor 100 coupling the input circuit to the common line 105. The transistor collector is connected to the thyratron or gaseous discharge device 110 through the resistor 106 and the common line 105 through the load resistor 107. Capacitor 108 may be connected between the grid and cathode of the thyratron 110 for filtering transients in a signal input to the thyratron grid to prevent misfiring.

The shield of the thyratron 110 is coupled to a phase shifted supply source through the resistor 111. Resistor 112 and capacitor 113 are connected across the secondary 94 to form an RC circuit to provide an inverted shield supply voltage lagging the plate supply voltage by $180° \pm 45°$, shown in Fig. 5 as the clipped wave form 114. Rectifier 115 passes the positive cycle of the shield supply voltage provided by the RC circuit connected across the secondary 94, and capacitor 116 filters any transient voltages which may occur in the secondary 94.

The output circuit 15 includes the relay 120 having normally open operating contacts 121 in the motor circuit. An additional output operating time circuit may be connected across the relay coil 120, as shown in Fig. 2 or 3, to provide a fixed or adjustable time lag before reset whereby the output circuit may be actuated for a timed interval added to the time that recession of the object disturbing the magnetic field would normally reset the device. The circuit operated by the system shows a motor 122 having a D.C. supply 123; however, as in the previous circuits, the specific output element controlled by the operating contacts 121 of relay 120 is not intended as a limitation but only as exemplary.

In operation, the secondary 94 supplies current for energizing opposing series connected driving coils 91 and 92. The magnetic field or the flux produced by the individual driving coils induces opposing alternating current voltages in the pickup coil 93 wherein the difference or resultant signal is coupled to the base of the transistor 100 or to the amplifier circuit 13. As in Figs. 2 and 3, the current in driving coils 91 and 92 is adjusted by resistors 96 and 99 to produce a resultant difference signal output in the pickup coil 93. This pickup signal is amplified by the transistor 100 and coupled to the grid control thyratron 110.

Figure 5:
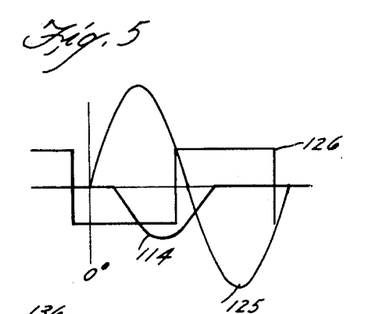
Fig. 5 illustrates typical wave forms for the circuit of Fig. 4.

The RC circuit including resistor 106 and capacitor 108 advances the phase of the amplified pickup signal 126 approximately 10° to permit a 10° phase shift of the pickup signal before the thyratron grid swings positive during the positive half cycle of the plate supply voltage. The signal on the shield of the thyratron 110 prevents misfiring or tail end conduction of the thyratron during the positive swing of the plate supply voltage as shown in Fig. 5.

Upon disturbance of the magnetic field causing the pickup or resultant signal Er to be retarded greater than 10° in phase, the amplified input signal to the grid 126 will be positive during the positive half cycle of the plate supply voltage causing the thyratron to fire and remain conductive throughout the remainder of the positive voltage swing of the supply voltage. Although a specific embodiment has been illustrated in Fig. 4, it should not be limited thereto since modifications of the circuit are contemplated to control the thyratron, magnetic amplifier or other circuits by the pickup signal as is common in thyratron or other control circuits.

Referring to Fig. 6, the magnetic transducer 130 includes a pair of series connected coils 131 and 132 which are similar in size and turns and connected to produce a closed magnetic field or flux when connected to a suitable source of alternating current supply. The center pickup coil 133 is wound around a ferromagnetic laminated core 134 common to the coils 131 and 132 whereby the voltages induced in the pickup coil 133 due to the opposing field set up by coils 131 and 132 produces a resultant pickup difference signal Er.

The coils may be wound on bobbins positioned on the cylindrical or rectangular magnetic core which is approximately the same length as the three coil assembly. The magnetic core 134 concentrates or focuses the fields set up by the driving coils and if the core 134 is positioned to balance the fields of the driving coils 131 and 132 about the pickup coil the induced voltages will cancel, resulting in an approximately zero signal output of the pickup coil 133. In order to adjust for the approximately zero signal output or null condition, the core 134 must be free to move along the axis of the coils or as shown, a tuning slug or disc 135 should be fitted near or in one end of the core.

In order to provide the desired disturbance of the magnetic field produced of the driving coils 131 and 132 by a metal object to be detected, a cylindrical magnetic or steel jacket 136 surrounds the coil assembly to shield the coils for external interference on all surfaces except the pickup end 137. The pickup end 137, therefore, may be sealed by a fiber cover plate which along with the fiber in plate 138 is secured to the coil assembly.

A brass mounting stud 141 may be threaded into the other end of the core 134 for guiding this end of the coil assembly relative to the steel jacket 136 and positioning the core longitudinally along the coil axis. The mounting stud, and hence the coil assembly, is centered by the fiber end plate 142 through the center hole 143. The fiber may be positioned against the seat 144 provided by internal recessing of the steel jacket 136 and the coil assembly wherein the coil assembly is further located longitudinally between the end plates by the fiber spacer 145. Mounting bracket 146 may be secured to the portion of the steel jacket extending past the end plate 42 for securing the magnetic transducer assembly near or relative to a conveyor belt, lathe, etc., where metal objects are to be detected. A brass nut 147 threaded upon the mounting stud 141, presses and seals core 134 and spacer 145 against the surface of the end plate 142. The end plate 142 may include suitable openings for terminal posts 148 whereby the coil leads may be attached to the cable 150. A steel back plate 151 is secured to the cylindrical steel jacket 136 and includes openings for passing through the mounting stud 141 and cable 150.

After assembly of the component parts of the magnetic transducer 130, and before the securing of the cover plate, the space between the coil assembly and the steel jacket 136 may be filled with potting compound sealing the coils against moisture, dirt, etc., and preventing damage due to vibration or shock. The driving coils 131 and 132 are excited by connecting respective leads to an alternating current source setting up magnetic fields within the steel jacket 136 and extending longitudinally of the assembly into the area adjacent cover plate 137. The magnetic field intercepting the turns of the pickup coil 133 induces alternating current voltages which are essentially opposing, wherein the difference in phase and amplitude of the induced voltages produces a resultant signal Er. The phase and amplitude of the resultant signal may be changed by varying the mutual inductance between either driving coil and the pickup coil. An initial adjustment of the resultant signal Er in phase and amplitude may be provided by a ferromagnetic disc or slug 135 as shown. Any other disturbance of the magnetic field will be produced by metal objects in the area adjacent to the cover plate 137.

Figure 6A:
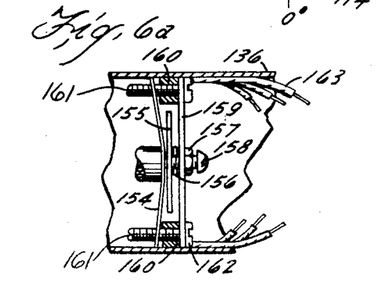
Fig. 6a is a partial view of a preferred embodiment of the magnetic transducer of Fig. 6 utilizing a disc for adjustment of the induced voltage components.

Referring to Fig. 6a, a preferred embodiment of the magnetic transducer employs a disc 155 adjustable relative to the adjacent driving coil and core by screw 158 which is threaded through the nuts 156 and 157 and the bracket 159. The disc 155 controls the permeability or inductive coupling of the pickup coil and the adjacent driving coil and therefore is of material having the desired electrical properties. The bracket 159 is mounted on brass members 160 threaded on studs 161 which may run the length of the coil assembly and which are attached to the end plate or fiber spacer at the opposite end of the coil assembly. A coil support 154 comprises a metal strip having openings at either end for passing through studs 161 and is spaced from the bracket 159 by members 160. The space members 160 may be threaded on the studs 161 and clamp the bracket 159 against the screw heads. The disc 155 is fastened rigidly to screw 158 by nut 156 and may be adjusted along the longitudinal axis of the transducer by turning the adjustment screw or stud 158 whereby the mutual inductance of the adjacent driving coil is controlled to vary the induced voltage component in the pickup coil. The leads 163 include the driving and pickup coil leads which may be brought out from within the steel jacket and connected to the alternating current supply source and the input of the detector circuit respectively.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

We claim:

1. In combination, a magnetic transducer for producing a magnetic field and detecting a disturbance of said magnetic field including a source of alternating current, a magnetic core, a pair of driving coils each surrounding a portion of the coil, circuit means for connecting said source to said driving coils to produce magnetic fields that are displaced in phase opposition by a predetermined angle, a pickup coil positioned in said magnetic fields and inductively coupled through the core with both driving coils and arranged to be responsive to said opposing magnetic fields wherein said alternating voltages are displaced from 180° phase opposition by an angle $\theta$ to produce a resultant voltage which is varied in phase by a disturbance of either magnetic field and a detector circuit means responsive to said resultant signal phase shift to operate an output circuit.

2. In combination, a magnetic transducer for producing a varying magnetic field and producing an output signal in response to a disturbance of said magnetic field by a metal object, circuit means for detecting said output signal to control a signal circuit comprising; a source of continuously varying current, a magnetic core, a pair of driving coils each surrounding a portion of the core, circuit means for connecting said source to said driving coils to produce opposing magnetic fields, a signal coil surrounding another portion of the core and positioned in said magnetic fields for having a voltage induced therein in response to variations in said opposing magnetic fields, means for normally adjusting said varying voltages in said driving coils from direct phase opposition by an angle $\theta$ to produce a resultant voltage in the signal coil which is varied in phase from said angle $\theta$ by a disturbance of either magnetic field changing the relative amplitude of said induced voltages, said detector circuit means including means responsive to said resultant signal phase shift to operate said signal circuit.

3. In combination, a detector circuit comprising a magnetic transducer including a magnetic core, a pair of driving coils and a single pickup coil arranged in inductive relation through said core with said driving coils, circuit means including a source of alternating current for energizing said driving coils to produce a magnetic field and normally induce opposing alternating current voltages in said pickup coil which are displaced from phase opposition by a predetermined angle $\theta$, transducer control means for controlling the amplitude and phase of said inducing voltages to vary the phase and amplitude of the resulting voltage, said pickup coil being responsive to a disturbance varying said magnetic field to change the phase of said resultant signal, and phase responsive circuit means connected to the output of said transducer for detecting the phase shift of said resultant signal and indicating a disturbance in the magnetic field.

4. In a signal circuit for detecting the presence of metal objects disturbing a magnetic field, a magnetic transducer including a rod-like core of ferro-magnetic material and a pair of driving coils and a single pickup coil wound around said core, circuit means including an A.C. source for energizing said driving coil to produce a magnetic field inducing opposing alternating voltages in said pickup coil which are normally displaced from 180° phase opposition by an angle $\theta$ to provide a resultant signal which is a vectorial sum of said induced voltages wherein said magnetic field is responsive to a metal object to vary said induced voltages and shift the phase of said resulting signal.

5. In a signal circuit for detecting the presence of metal objects by disturbing a magnetic field, a magnetic transducer including a rod-like core of ferromagnetic material and a pair of driving coils and a single pickup coil axially aligned on said core, circuit means including an A.C. source for energizing said driving coils to produce a magnetic field inducing an alternating voltage in said pickup coil and a normal resultant output signal which is a vectorial sum of the flux of the fields, said transducer being responsive to a metal object within the magnetic field of the driving coils thereby shifting the phase of said resultant signal and a signal circuit coupled to said pickup coil for detecting the phase shift of said resultant signal.

6. A signal circuit for detecting the presence of metal objects comprising; a magnetic transducer having a laminated rod-like core of ferromagnetic material, a pair of driving coils connected in series and wound about said core to produce opposing magnetic fields, a single pickup coil wound around said core and in inductive relation to both of said driving coils, adjustable means in said transducer for approximately balancing the magnetic fields around said pickup coil and thereby the voltages induced in said pickup coil to normally produce a predetermined minimum resultant signal which is the vectorial sum of said two voltages and approximately in phase quadrature with either of said induced voltages, said transducer being responsive to a metal object introduced in one of the magnetic fields to change the corresponding induced voltage component in the pickup coil to vary the phase and amplitude of the resultant signal and means responsive to the phase change in said signal.

7. A signal circuit for detecting the presence of metal objects comprising; a magnetic transducer having a rod-like laminated core of ferromagnetic material, a pair of driving coils connected in series and wound about said core to produce opposing magnetic fields, a single pickup coil wound around said core and in inductive relation to both of said driving coils, a resistor connected across at least one of the driving coils to control the relative phase angle of said voltages, a metal member axially movable relative to said core in the field of one of said driving coils for balancing the magnetic fields and amplitude of the induced voltages in said pickup coil to produce a minimum resultant signal approximately in phase quadrature with either of said induced voltages whereby said transducer is responsive to a metal object introduced in one of the magnetic fields to increase the corresponding induced voltage in the pickup coil and vary the phase and amplitude of the resultant signal and means responsive to the phase change in the signal.

8. A metal detector comprising in combination, a laminated ferromagnetic rod, a pair of driving coils wound around opposite ends of said rod having terminals for connection to an A.C. source to excite said coils and produce opposing magnetic fields, a single signal coil positioned between said driving coils and wound around said rod, said signal coil being inductively coupled to both of said driving coils for inducing voltages proportional to said opposing magnetic fields, a resistor connected across at least one of said driving coils for adjusting the phase angle of said induced voltages, adjustable means axially movable relative to said rod for varying the inductive coupling of at least one driving coil and said signal coil and adjusting the amplitude of the opposing induced voltages in said signal coil, said opposing induced voltages in the signal coil producing a resultant signal having a vectorial sum which is shifted in phase from either induced voltage component whereby a disturbance of either magnetic field by a metal object varies the corresponding induced voltage and shifts the phase of the resultant signal, a phase detector circuit coupled to said signal coil responsive to a shift in phase of said signal and circuits means for controlling an output circuit in response to the phase shift of said resultant signal.

9. A signalling circuit including in combination, magnetic transducer having a laminated ferromagnetic rod for providing a magnetic circuit path, a pair of driving coils wound around opposite ends of said rod having terminals for connection to an A.C. source to excite said driving coils and produce opposing magnetic fields, a single signal coil positioned between said driving coils and wound around said rod, said signal coil being inductively coupled to both of said driving coils for inducing voltages proportional to said opposing magnetic fields, a resistor connected across at least one of said driving coils for adjusting the phase angle of said induced voltages, adjustable means axially movable relative to said rod for varying the inductive coupling of at least one driving coil and saign signal coil for adjusting the amplitude of the opposing induced voltages in said signal coil, said opposing induced voltages adding vectorially to produce a resultant signal which is shifted in phase from either inducing voltage component whereby a disturbance of either magnetic field by a metal object varies the corresponding induced voltage in said signal coil and shifting the phase of the resultant signal, a phase detector circuit coupled to said signal coil and including a signal circuit, said detector circuit being responsive to a shift in phase of sad resultant signal to operate signal circuit.

10. A magnetic transducer comprising; a coil assembly including a ferromagnetic rod forming a core for said transducer, a pickup coil wound around the center of said core, and a driving coil wound around each end of the core, a disc of ferromagnetic material adjustably coupled to an end of said core for varying the inductive coupling of the adjacent driving coil and the pickup coil, a shield of magnetic material surrounding said coil assembly and having an open end permitting a magnetic field produced by a driving coil to extend into a pickup area located longitudinally from one end of said core and coil assembly whereby metal objects passing through said area will disturb the magnetic field and inductive coupling between the driving coil adjacent the pickup area and the pickup coil.

11. In a proximity detector device of the character described, the combination comprising; a rod of magnetic material forming a core for the device, a pair of driving coils fixedly mounted on opposite ends of the core and connected to a source of A.C. current so the output magnetic flux fields of the coils are in opposition, an output coil fixed on the rod between said driving coils and magnetically coupled with the driving coils, a means axially movable relative to the core for varying the reluctance of one of the driving coils relative to the other and means for adjusting the phase angle of the voltages across the driving coils so the voltages thereacross are displaced by a predetermined angle from phase opposition.

12. In a proximity detector transducer of the character described, the combination comprising; a rod of magnetic material forming a core for the transducer, a pair of driving coils fixedly mounted on opposite ends of the core and connected to a source of A.C. current so the output magnetic fields of the coils are opposed, an output coil fixed on the rod between the driving coils and magnetically coupled therewith, means axially movable relative to the core for varying the reluctance of one of the driving coils relative to the other, and means for varying the current flow in one of the driving coils relative to the other so the voltages thereacross are displaced by a predetermined angle from phase opposition.

13. In a proximity detector transducer of the character described, the combination comprising; a rod of magnetic material forming a core for the transducer, a pair of exciter coils fixed on opposite ends of the rod and connected to each other and to a source of A.C. current so their output magnetic fluxes are in opposition, an output coil fixed on the rod between the exciter coils and magnetically coupled therewith, means axially movable relative to the core for varying the reluctance of one of the exciter coils relative to the other, means for varying the relative current flow through one of the exciter coils relative to the other exciter coil so the voltages thereacross are displaced by a predetermined angle from phase opposition and an enclosure for the coils and rod.

14. In a device of the character described, the combination comprising; a rod of magnetic material forming a magnetic core for the device, a pair of exciter coils fixedly mounted and spaced on opposite ends of the rod and interconnected with each other and connected to a source of A.C. current so the output magnetic fluxes are substantially in opposition, an output coil positioned on the rod between the exciter coils, a means axially movable relative to the core for varying the reluctance of the magnetic flux of one exciter coil relative to the other exciter coil, an enclosure for said coils and core for shielding said device from the effects of objects disposed transversely to the core and an enclosure for at least one end of said device which will permit the magnetic field of at least one coil to be effected by objects in axial alignment with the core.

15. In a transducer of the character described, the combination comprising; a rod of magnetic material forming a magnetic core for the transducer, a pair of exciter coils fixedly mounted on the rod and spaced on opposite ends thereof, an output coil fixed on the rod between the exciter coils, a shield of magnetic material surrounding the coils and having an open end and a closure of non-magnetic material for closing the open end of the shield.

16. The combination as set forth in claim 15 wherein the exciter coils are constructed and arranged and connected to a source of A.C. current so the voltages across the exciter coils are substantially balanced in amplitude and displaced by a predetermined phase angle relative to each other.

17. The combination as set forth in claim 16 wherein an adjustable means axially movable relative to the core will adjustably vary the reluctance of one of the exciter coils relative to the other.

18. The combination as set forth in claim 15 wherein means are included for varying the current flow in one of the exciting coils relative to the other.

19. In an apparatus of the character described, the combination comprising; a device having; a rod-like magnetic core, a single output coil fixed on the core, a pair of driving coils fixed on the core constructed and arranged for normally inducing opposed fluxes of substantially equal magnitude that are displaced in phase opposition by a predetermined phase angle in the core all of said coils being inductively coupled with one another so a variation in the reluctance of one of said coils results in a change in the phase angle of the output coil and means responsive to a change in said phase angle in the output coil of said device.

20. In an apparatus of the character described, the combination comprising; a device having; a rod-like magnetic core, a single output coil fixed on the core, a pair of driving coils fixed on the opposed ends of the core and constructed and arranged for normally inducing opposed fluxes of substantially equal magnitude that are displaced in phase opposition by a predetermined phase angle in the core, said coils being inductively coupled with one another so a variation in reluctance of one of the driving coils results in a variation in phase angle of the output coil, and means operative in response to a change in the phase angle of the output coil of said device.

21. The method of detecting the proximity of a metal object comprising; exciting a first circuit means with A.C. current to produce a pair of flux paths in a magnetic core which flux paths are in opposition and normally out of phase opposition by a predetermined angle, bringing a metal object into the proximity of the core for changing the relative reluctance of the flux paths and thereby varying the phase angle of the fluxes in the core, and detecting the change in phase of the fluxes in the core from the normal out of phase relationship.

22. The method as set forth in claim 21 including the step of adjusting the current flow in the first circuit to obtain the predetermined out of phase relationship of the fluxes.

23. In a magnetic detector, the combination comprising; a first inductive circuit means including a first coil adapted to be connected to an A.C. source for producing a fluctuating magnetic field, a second circuit means including a second coil coupled to the first circuit means and the A.C. source and arranged to produce a fluctuating magnetic field which opposes the magnetic field of the first circuit means, a third coil inductively coupled to both of the other coils and arranged to have an output voltage signal which is the vectorial sum of the magnetic fields of said first and second means, means for adjusting said circuit means so the respective voltages induced in the third coil by the first and second coils are substantially equal in magnitude and displaced from phase opposition from each other by a predetermined angle, said first and second coils being arranged for producing a resultant voltage signal in said pickup coil which is shifted in phase by a disturbance of said magnetic fields and means for detecting the shift in phase of the resultant signal.

References Cited in the file of this patent

UNITED STATES PATENTS

| | | |
|---|---|---|
| Re.21,003 | Knerr et al. | Feb. 14, 1939 |
| 2,104,643 | Greenslade | Jan. 4, 1938 |
| 2,104,644 | Greenslade | Jan. 4, 1938 |
| 2,237,254 | Broekhuysen | Apr. 1, 1941 |
| 2,321,356 | Berman | June 8, 1943 |
| 2,489,920 | Michel | Nov. 29, 1949 |
| 2,502,626 | Mages | Apr. 5, 1950 |
| 2,598,252 | Gossick | May 27, 1952 |
| 2,609,530 | Tricebock et al. | Sept. 2, 1952 |

UNITED STATES PATENT OFFICE
CERTIFICATE OF CORRECTION

Patent No. 2,915,699                                        December 1, 1959

Robert C. Mierendorf et al.

It is hereby certified that error appears in the printed specification of the above numbered patent requiring correction and that the said Letters Patent should read as corrected below.

Column 6, line 25, for "this" read -- the --; column 11, line 51, for "coils for" read -- coils from --; line 66, for "plate 42" read -- plate 142 --; column 12, line 62, for "coil" read -- core --; column 14, line 63, for "saign" read -- said --.

Signed and sealed this 14th day of June 1960.

(SEAL)
Attest:

KARL H. AXLINE                                      ROBERT C. WATSON
Attesting Officer                                   Commissioner of Patents